United States Patent [19]

Iwabuchi et al.

[11] Patent Number: 5,287,334
[45] Date of Patent: Feb. 15, 1994

[54] MAGNETO-OPTICAL PICKUP APPARATUS AND MAGNETO-OPTICAL RECORDING/REPRODUCING APPARATUS

[75] Inventors: Kietsu Iwabuchi; Koji Sasaki, both of Miyagi; Tetsu Watanabe, Tokyo; Tamotsu Yamagami, Kanagawa; Yoshio Aoki, Tokyo, all of Japan

[73] Assignee: Sony Corporation, Tokyo, Japan

[21] Appl. No.: 808,077

[22] Filed: Dec. 11, 1991

Related U.S. Application Data

[63] Continuation of Ser. No. 553,785, Jul. 13, 1990, abandoned.

[30] Foreign Application Priority Data

Jul. 29, 1989 [JP] Japan .................. 1-197349
Jan. 30, 1990 [JP] Japan .................. 2-19989

[51] Int. Cl.$^5$ ............................. G11B 5/127
[52] U.S. Cl. ........................ 369/13; 360/114
[58] Field of Search ........... 369/13, 292; 365/122; 360/59, 114

[56] References Cited

U.S. PATENT DOCUMENTS

| 4,466,004 | 8/1984 | Kobayashi | 369/13 |
| 4,677,513 | 6/1987 | Naito | 360/114 |
| 4,807,204 | 2/1989 | Mizutani | 360/59 |
| 4,868,802 | 9/1989 | Kobori | 369/13 |
| 4,926,403 | 5/1990 | Tsuyuguchi | 369/13 |
| 5,022,018 | 6/1991 | Vogelgesang | 369/13 |

FOREIGN PATENT DOCUMENTS

| 0286070 | 10/1988 | European Pat. Off. | 369/13 |
| 3730969 | 3/1989 | Fed. Rep. of Germany | 369/13 |
| 0122244 | 9/1980 | Japan | 369/13 |
| 0195303 | 12/1982 | Japan | 360/59 |
| 0117180 | 6/1984 | Japan | 369/13 |
| 0117703 | 7/1984 | Japan | 369/13 |
| 0029904 | 2/1985 | Japan | 369/13 |
| 0190741 | 8/1986 | Japan | 369/13 |
| 0198453 | 9/1986 | Japan | 369/13 |
| 0112253 | 5/1987 | Japan | 360/114 |
| 0125554 | 6/1987 | Japan | 360/114 |
| 0273638 | 11/1987 | Japan | 360/114 |
| 2-158942 | 6/1990 | Japan | G11B 11/10 |

OTHER PUBLICATIONS

Vol. 10, No. 76 (P-440) (2133) Mar. 26, 1986 & JP-A-60 214 438 (Suwa Seikosha K.K.) Oct. 26, 1985.
Vol. 13, No. 9 (P-811)(3357) Jan. 11, 1989 & JP-A-63 217 547 (Fujitsu Ltd.) Sep. 9, 1988.
Vol. 9, No. 156 (P-368)(1879) Jul. 29, 1985 & JP-A-60 029 904 (Seiko Denshi Kogyo K.K.) Feb. 15, 1985.

*Primary Examiner*—Steven Mottola
*Attorney, Agent, or Firm*—Philip M. Shaw, Jr.

[57] ABSTRACT

A magneto-optical pickup apparatus includes an objective lens for focusing a laser beam emitted from a laser device onto a magneto-optical recording medium, driving coils, on which the objective lens is mounted, for driving the objective lens in focusing and tracking directions, and a plate arranged at an end portion of the driving coils between the objective lens and the magneto-optical recording medium. The plate is formed with a coil pattern for generating a magnetic field to be applied to the magneto-optical recording medium, and can allow a laser beam transmitted through the objective lens to pass therethrough.

14 Claims, 6 Drawing Sheets

MAGNETO-OPTICAL PICKUP APPARATUS AND MAGNETO-OPTICAL RECORDING/REPRODUCING APPARATUS

This is a continuation of co-pending application Ser. No. 07/553,785 on Jul. 13, 1990, now abandoned.

BACKGROUND OF THE INVENTION

1. Field of the Invention

The present invention relates to a magneto-optical pickup apparatus for recording/reproducing an information signal or from a magneto-optical recording medium by utilizing a magneto-optical effect such as a magnetic Kerr effect or a Faraday effect, and a magneto-optical recording/reproducing apparatus using the same.

2. Description of the Prior Art

Background art in order to record a signal on a magneto-optical recording medium, it is known to use a light modulation method or a magnetic field modulation method. Of these methods, the magnetic field modulation method is advantageous since it can achieve an overwrite operation.

FIG. 1 shows a conventional magneto-optical pickup apparatus in which the magnetic field modulation method is employed.

A magneto-optical pickup apparatus shown in FIG. 1 is arranged as follows. When a single-sided magneto-optical recording medium 50 is loaded, an optical system including a laser device 58, an objective lens 59 and the like is arranged on the upper surface side of the single-sided magneto-optical recording medium 50, and a magnetic field generator 60 is arranged on the lower surface side of the recording medium 50.

A driving system (not shown) is arranged to drive the optical system in focusing and tracking directions with respect to the magneto-optical recording medium 50. Another driving system (not shown) is arranged to drive the magnetic field generator 60 in the direction of an arrow in FIG. 1 and the tracking direction.

In the magnetic field modulation method, since a magnetic field must be reversed at high speed, a sufficient excitation current cannot be obtained, and the generated magnetic field strength is limited. For this reason, the magnetic field generator 60 is arranged near a recording magnetic layer 53 (to be described later) of the single-sided magneto-optical recording medium 50.

The single-sided magneto-optical recording medium 50 is constituted by sequentially stacking a dielectric layer 52, a recording magnetic layer 53 formed of, e.g., a rare earth-transition metal alloy amorphous thin film, and having a large magneto-optical effect, a dielectric layer 54, a reflecting layer 55 and a protection cover 56 on one surface of a transparent substrate 51 formed of, e.g., polycarbonate. In this case, the thickness of the transparent substrate 51 is constant, e.g., 1.2 mm.

An operation of the prior art device will be briefly described below.

The single-sided magneto-optical recording medium 50 is placed on a rotary disk (not shown), and a magnetic field is applied from the magnetic field generator 60 to the recording magnetic layer 53 of the single-sided magneto-optical recording medium 50. The magnetic field to be applied is reversed at high speed, and a laser beam emitted from the laser device 58 is focused on the recording magnetic layer 53 applied with the magnetic field, so that a region of the recording magnetic layer 53 where the laser beam is focused can be magnetized, and an information signal can be overwritten in real time.

Along with an increase in information volume in recent years, a double-sided magneto-optical recording medium which can record information signals on two surfaces has been developed.

As shown in FIG. 2, a conventional double-sided magneto-optical recording medium 70 is constituted by bonding a magneto-optical recording medium A obtained by sequentially stacking a transparent substrate 71a, a dielectric layer 72a, a recording magnetic layer 73a, a dielectric layer 74a and a reflecting layer 75a, and a magneto-optical recording medium B obtained by sequentially stacking a transparent substrate 71b, a dielectric layer 72b, a recording magnetic layer 73b, a dielectric layer 74b and a reflecting layer 75b by means of an adhesive 76. In this double-sided magneto-optical recording medium 70, the thickness of the transparent substrates 71a and 71b is several mm to assure a sufficient mechanical strength. Since the recording medium 70 is constituted by stacking the transparent substrates 71a and 71b, the recording magnetic layer 73a, and 73b and the like, the medium 70 becomes thicker than to the single-sided magneto-optical recording medium 50.

When the conventional magneto-optical pickup apparatus of the magnetic field modulation type shown in FIG. 1 employs the double-sided magneto-optical recording medium 70, the following problems arise. Since the optical system is arranged on the upper surface side of the double-sided magneto-optical recording medium 70 and the magnetic system is arranged on the lower surface side thereof to perform recording, if recording is performed on the upper magneto-optical recording medium A of the double-sided magneto-optical recording medium 70, a laser beam can be focused on the recording magnetic layer 73a from the upper surface side. But a magnetic field with a sufficient intensity cannot be applied from the magnetic field generator 60 on the lower surface side since the recording medium 70 itself is too thick. In the magnetic field modulation type magnetic field generator, a high-frequency current responding to a high-frequency data signal must be flowed through an electromagnetic coil. However, since the current cannot easily be flowed through the coil as the frequency is increased, the generated magnetic field is limited. In addition, the distance between the magnetic field generator 60 and the recording magnetic layer 73a is large. For this reason, it is very difficult to achieve double-sided magneto-optical recording of a magnetic field modulation method by the conventional techniques.

OBJECT AND SUMMARY OF THE INVENTION

It is an object of the present invention to provide a magneto-optical pickup apparatus, which can perform recording/reproduction for a magneto-optical recording medium with a simple arrangement, and in which an optical system and a magnetic system can be arranged on the same side of the medium, and a magneto-optical recording/reproducing apparatus using the same.

In order to achieve the above object of the present invention, there is provided a magneto-optical pickup apparatus for recording or reproducing data on a magneto-optical recording medium, for use with a laser beam emission means, comprising laser beam focusing means for focusing a laser beam emitted from the laser beam emission means onto the magneto-optical recording medium, and magnetic field generating means, arranged adjacent to the laser beam focusing means, for generating a magnetic field to be applied to the magneto-optical recording medium, wherein the magnetic field generating means comprises a plate through which the laser beam can pass, and a thin film coil pattern, formed on the surface of the plate facing the recording medium, formed, for generating the magnetic field.

A magneto-optical recording/reproducing apparatus of the present invention is arranged in such a manner that such magneto-optical pickup apparatuses are disposed on both sides of a magneto-optical recording medium to be used, and can perform recording/reproduction on its two surfaces.

In the magneto-optical pickup apparatus described above, a magnetic field to be applied to a magneto-optical recording medium is generated from a plate on which a coil pattern is formed, and this plate can allow light to pass therethrough. Thus, the plate can be arranged adjacent to the laser beam focusing means, and the optical system and the magnetic system can be arranged on the same surface side of the magneto-optical recording medium. Since the distance between the coil pattern and the magneto-optical recording medium can be shortened, the magnetic field from the coil pattern can be applied to the magneto-optical recording medium from a position closer to the medium than with a prior art apparatus. Therefore, recording/reproduction can be performed on a double-sided magneto-optical recording medium according to the magnetic field modulation method.

BRIEF DESCRIPTION OF THE DRAWINGS

The foregoing and other objectives, features and advantages of the invention will be more readily understood upon consideration of the following detailed description of certain preferred embodiments of the invention, taken in conjunction with the accompanying drawings, in which.

DETAILED DESCRIPTION OF THE PREFERRED EMBODIMENTS

Embodiments of the present invention will be described below with reference to FIGS. 3 to 7.

Figure 3:
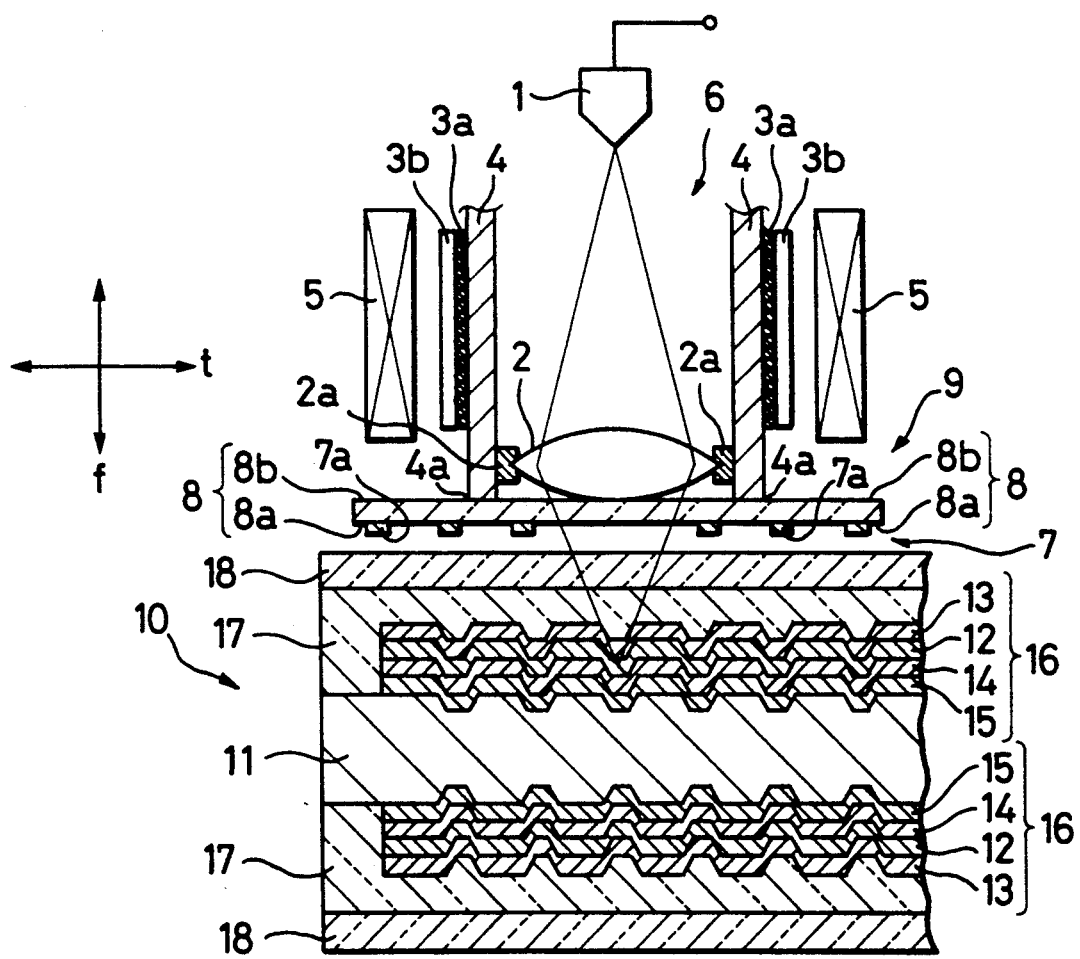
FIG. 3 is a sectional view showing an arrangement of a magneto-optical pickup apparatus according to an embodiment of the present invention.

FIG. 3 is a sectional view of a magneto-optical pickup apparatus according to the embodiment 1 of the present invention.

In the magneto-optical pickup apparatus shown in FIG. 3, comprises a pickup 6 is comprised of an optical system including a laser device 1, an objective lens 2, a coil bobbin 4 around which a focusing coil 3a and a tracking coil 3b are wound, and magnetic system including a magnet 5 arranged around the coil bobbin 4, and a magnetic field generator 9.

The coil bobbin 4 of the pickup 6 has, e.g., a cylindrical shape, and the focusing coil 3a for driving the pickup 6 in a direction f in FIG. 3 and the tracking coil 3b for driving the pickup 6 in a direction t in FIG. 3 are arranged around the bobbin 4. A lens support member 2a is arranged at a position close to an end portion 4a of the coil bobbin 4. The member 2a supports the objective lens 2 for focusing a laser beam emitted from the laser device 1.

Figure 4:
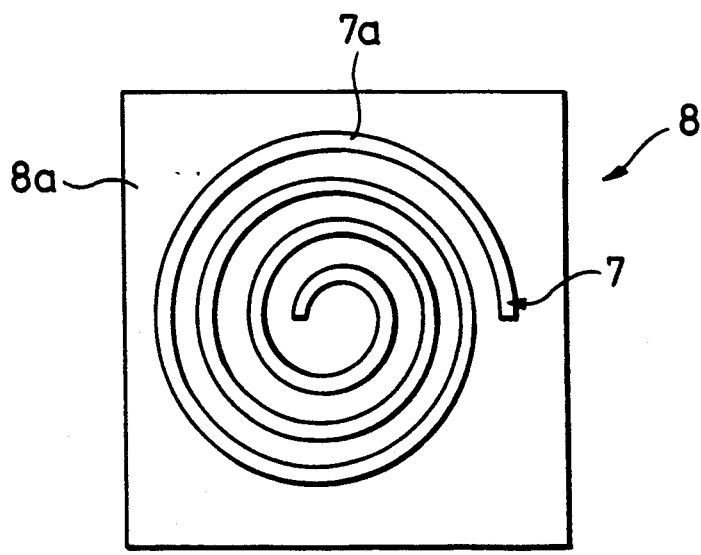
FIG. 4 is a front view of an optical glass formed with a coil pattern, which can be used in the magneto-optical pickup apparatus shown in FIG. 3.

The magnetic field generator 9 is constituted as follows. That is, as shown in FIG. 4, a conductor 7a through which a current of a high-frequency signal is flowed to generate a magnetic field is formed, as a spiral coil pattern 7, on a surface 8a (the lower surface as shown in FIG. 3) of an optical glass 8 of, e.g., silica glass having light transmission characteristics. The surface 8a is positioned immediately adjacent to the recording medium 10. The end portion 4a of the coil bobbin 4 is adhered and fixed to a surface 8b (the upper surface on which no coil pattern 7 is formed in FIG. 3) of the optical glass 8 so that the center of the coil pattern 7 is aligned to coincide with the center of the objective lens 2. Thus, since the laser beam can be focused on the center of the generated magnetic field, a centering adjustment in assembly of the pickup can be omitted.

The optical glass 8 is not limited to silica glass as long as it has light transmission characteristics. The coil pattern 7 may comprise, e.g., a printed coil, a thin film coil and the like, referred to throughout this application generically as a thin film coil.

A first double-sided magneto-optical recording medium 10 shown in FIG. 3 is described in the specification and drawings of Japanese Patent Application No. 14256/1989 previously filed by the present applicant in Japan. In this medium, recording sections 16, photocuring resin layers 17 and transparent protection plates 18 are respectively arranged on two surfaces of a common substrate 11.

In each recording section 16, a reflecting layer 15 is arranged to be closer to the substrate 11 than a recording magnetic layer 12. The reflecting layer 15, a second dielectric layer 14, the recording magnetic layer 12, and a first dielectric layer 13 are stacked on the substrate 11.

Figure 1:
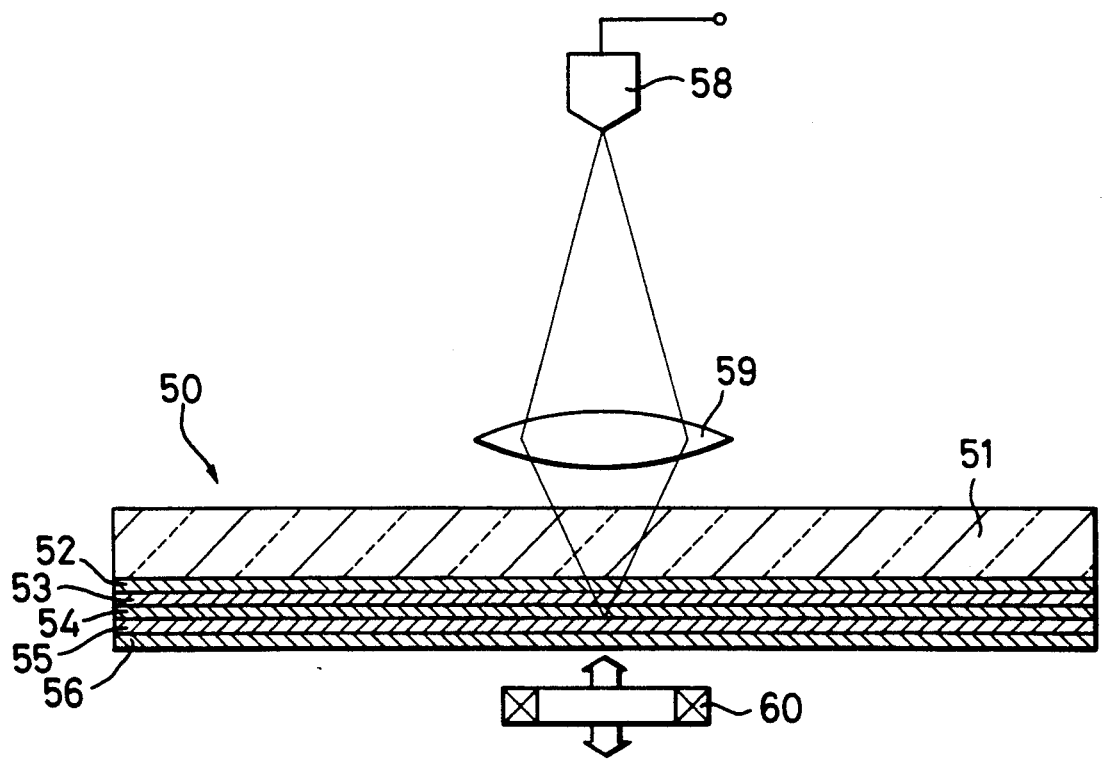
FIG. 1 is a sectional view showing an arrangement of a conventional magneto-optical pickup apparatus.
Figure 2:
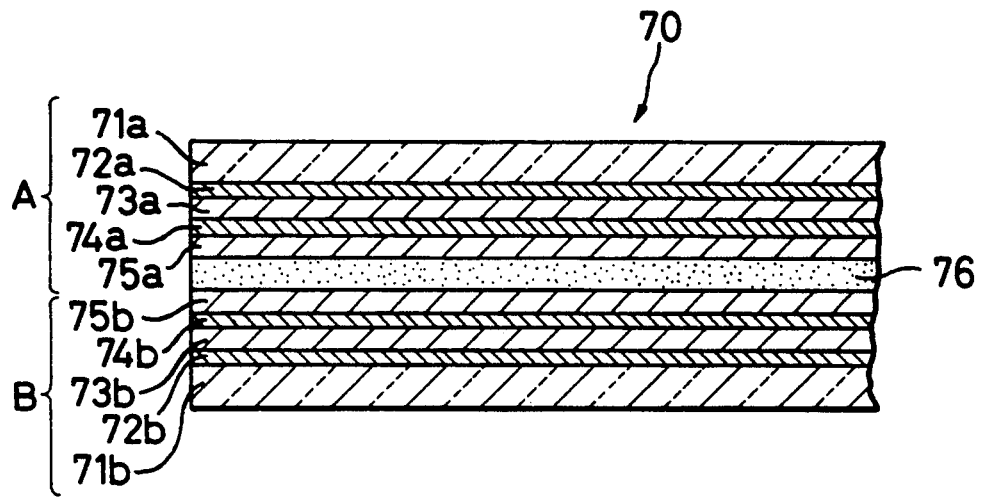
FIG. 2 is a sectional view showing a structure of a conventional double-sided magneto-optical recording medium.

Since the double-sided magneto-optical recording medium 10 has a common substrate 11, its thickness can be halved as compared to the conventional double-sided magneto-optical recording medium 50 constituted by adhering two substrates as shown in FIG. 2.

The operation of the apparatus shown in FIG. 3 will be described below.

In the magneto-optical pickup apparatus with the above arrangement, when a focusing drive current is supplied to the focusing coil 3a, the coil bobbin 4 and the magnetic field generator 9 arranged in the coil bobbin 4 are shifted in a focusing direction as an optical axis direction of the objective lens 2 indicated by an arrow f in FIG. 3. When a tracking drive current is supplied to the tracking coil 3b, the coil bobbin 4 and the magnetic field generator 9 are shifted in a tracking direction as a direction perpendicular to the optical axis of the objective lens 2, as indicated by an arrow t in FIG. 3.

At the same time, a high-frequency current signal obtained by amplifying a signal to be recorded is supplied to the coil pattern 7, formed of the conductor 7a, of the magnetic field generator 9, thereby generating a magnetic field. The magnetic field is reversed at high speed in response to the signal to be recorded, and extends to the recording magnetic layer 12 of the double-sided magneto-optical recording medium 10. A laser beam emitted from the laser device 1 is focused on a region of the recording magnetic layer 12, where the magnetic field is applied, through the objective lens 2 and the optical glass 8 having light transmission characteristics to increase the temperature of the recording magnetic layer 12 beyond its Curie temperature, thus recording an information signal.

As can be seen from the above description, in a magneto-optical pickup apparatus of this embodiment, the optical system of the pickup 6 comprising the laser device 1, the objective lens 2 and the like, and the magnetic system with the magnetic field generator constituted by forming the coil pattern 7 on the optical glass 8 are arranged on the same surface side of the double-sided magneto-optical recording medium 10, so that the distance between the coil pattern and the magneto-optical recording medium 10 can be shortened. For example, as will be described in the second and third embodiments, recording and reproduction on the double-sided magneto-optical recording medium by the magnetic field modulation method, which are very difficult to achieve by the conventional method, can be realized.

The coil bobbin 4 of the pickup 6 and the magnetic field generator 9 are fixed by, e.g., bonding, so that the center of the objective lens 2 can be easily aligned with the center of the magnetic field of the magnetic field generator 9. In addition, since the pickup 6 and the magnetic field generator 9 can be operated together with each other by focus servo, the strength of the magnetic field to be applied to the double-sided magneto-optical recording medium can be kept constant. Therefore, a driving system for the magnetic system which is required in the conventional apparatus can be omitted. Since the magneto-optical pickup apparatus is thus smaller than that of the prior art apparatus, the degree of freedom in design for the apparatus can be increased.

Note that reproduction of the double-sided magneto-optical recording medium 10 can be realized by using the laser device 1 and a light detection means (not shown) which includes a deflection beam splitter (not shown) arranged between the laser device 1 and the objective lens 2.

Figure 5:
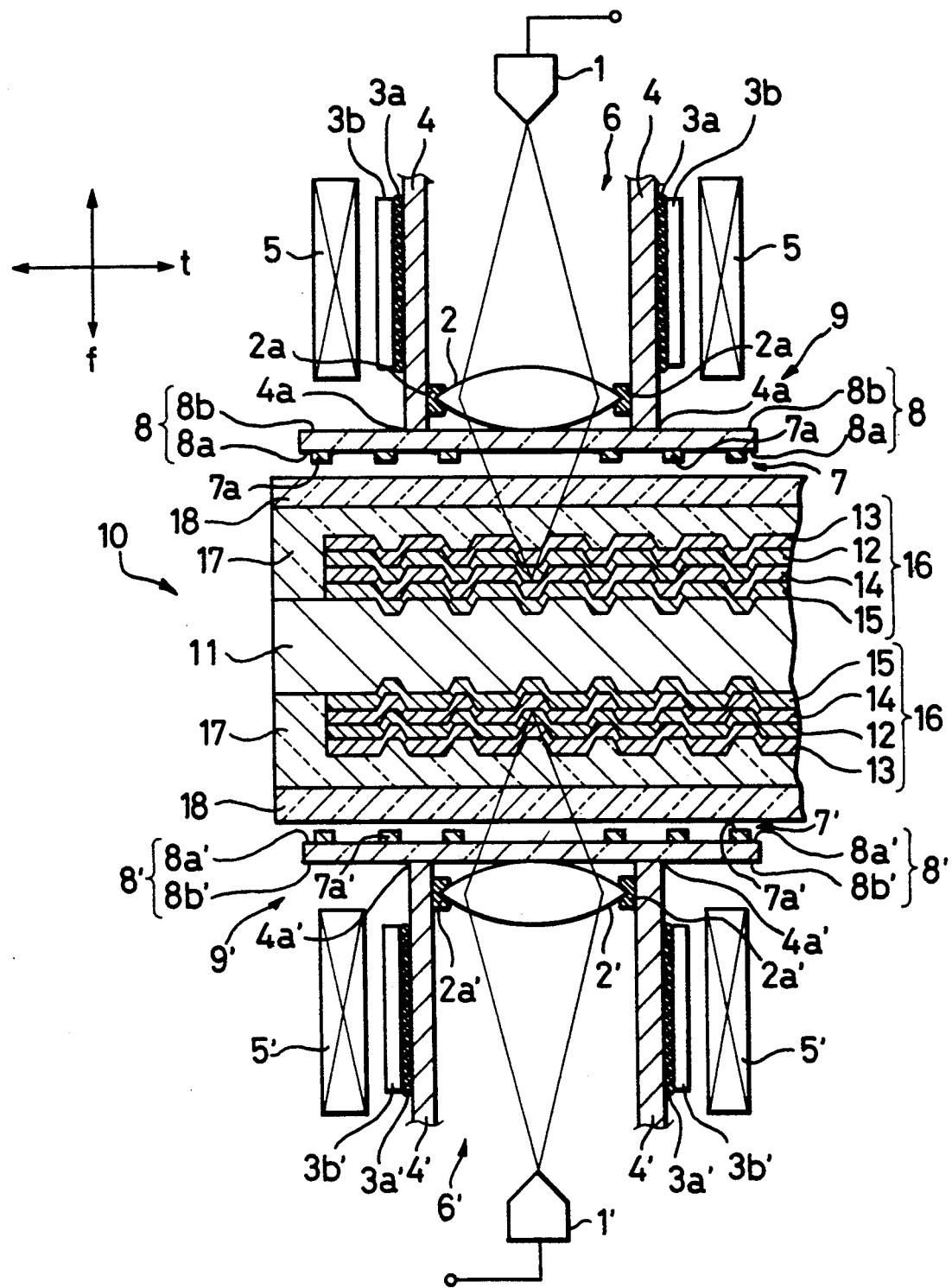
FIG. 5 is a sectional view showing an arrangement of a magneto-optical pickup apparatus according to a second embodiment of the present invention.

The second embodiment will be described below. As shown in FIG. 5, since a magneto-optical pickup apparatus is also arranged on the lower surface side of a double-sided magneto-optical recording medium 10 shown in FIG. 3, this embodiment comprises first and second magneto-optical pickup apparatuses on the both upper and lower surface sides of double-sided magneto-optical recording medium 10.

In this case, the first and second magneto-optical pickup apparatuses disposed on opposite sides of the medium 10 may be the same as the apparatus described in the suffixed in numerals and letters of elements 1' to 9' of the second magneto-optical pickup apparatus shown in FIG. 5 correspond to those denoted by reference numerals 1 to 9 in FIGS. 3 and 4, and a detailed description thereof will be omitted.

The first and second magneto-optical pickup apparatuses are operated in the same manner as that in the first embodiment. The first and second pickup apparatuses are synchronously driven in the directions f and t, respectively.

According to the second embodiment, recording and reproduction of the double-sided magneto-optical recording medium can be performed. For example, when the laser devices 1 and 1' and the magnetic field generators 9 and 9' are used at the same time, simultaneous recording on the upper and lower surfaces of the double-sided magneto-optical recording medium 10 can be performed. When the laser devices 1 and 1' are used at the same time, simultaneous reproduction can be performed. Thus, the capacity of the medium can be increased, and recording and reproduction of an information signal can be realized at higher speed.

In addition, recording or reproduction can be performed on one surface of the double-sided magneto-optical recording medium 10, and then, recording or reproduction can be performed on the other surface. Thus, recording and reproduction of a capacity twice that of a single-sided magneto-optical recording medium are allowed.

In the above-mentioned case, when recording is performed on one surface, the two magnetic field generators 9 and 9' can be used at the same time, while the magnetic field generator 9' or 9 respectively arranged on the other surface side is generating a magnetic field. Therefore, since the magnetic fields can be applied from two surface sides to one magnetic recording layer 12, recording can be performed at a higher magnetic field strength.

When recording is performed on one surface, recording can be performed using the magnetic field generator arranged on the other surface side.

Figure 6:
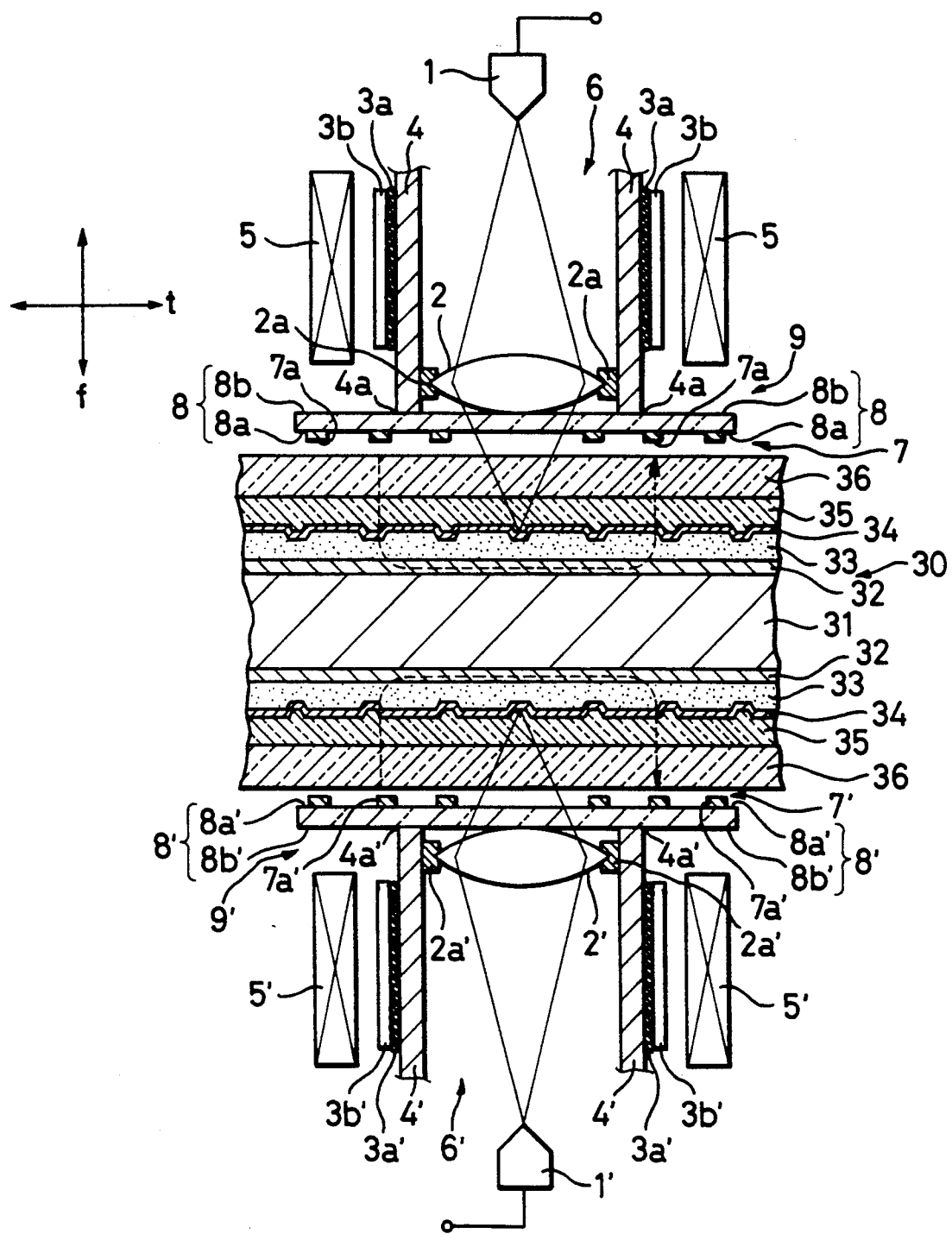
FIG. 6 is a sectional view showing an arrangement of a magneto-optical pickup apparatus according to a third embodiment of the present invention.
Figure 7:
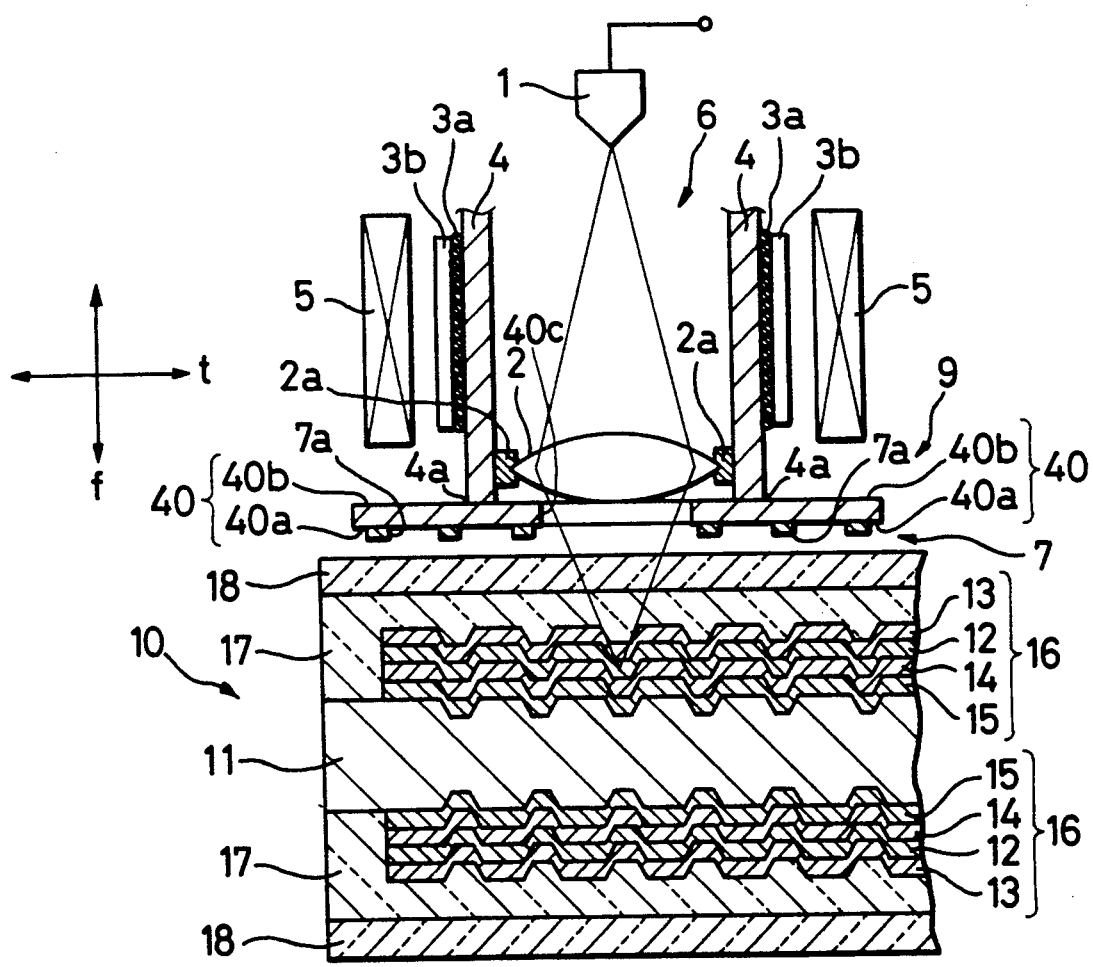
FIG. 7 is a sectional view showing an arrangement of a magneto-optical pickup apparatus according to a fourth embodiment of the present invention.

The third embodiment will be described below. As shown in FIG. 6, this embodiment employs the same magneto-optical pickup apparatuses as in FIG. 5, and can use a second double-sided magneto-optical recording medium 30 shown in FIG. 6 to perform recording and reproduction.

The second double-sided magneto-optical recording medium 30 has been proposed in the specification and drawings of Japanese Patent Application No. 274734/1989 by one of the present inventors together with other inventors. In this medium, high-permeability layers 32, photo-curing resin layers 33, magneto-optical recording layers 34, adhesive layers 35, and transparent protection plates 36 are sequentially stacked on the two surfaces of a common substrate 31, respectively. Each high-permeability layer 32 is formed of a material having a high magnetic permeability, such as a transition metal (e.g., Fe, Co, Ni or the like), a permalloy as their alloy, sendust or an amorphous magnetic alloy. The layer 32 can improve a perpendicular magnetic field efficiency in a direction perpendicular to the surface of the double-sided magneto-optical recording medium 30.

In the third embodiment, since the second double-sided magneto-optical recording medium 30 includes the high-permeability layer 32, magnetic fluxes from magnetic field generators 9 and 9' form magnetic closed loops, as indicated by broken lines in FIG. 6. Therefore, magnetic fluxes applied to the double-sided magneto-optical recording medium 30 can be effectively focused in a recording mode, so that the perpendicular magnetic field efficiency of the medium 30 is improved.

In the third embodiment, since recording or reproduction can be simultaneously executed on the two surfaces of the double-sided magneto-optical recording medium, or after recording or reproduction is performed on one surface, recording or reproduction can then be performed on the other surface.

In the magnetic field generator 9 or 9' in each of the three embodiments of the magneto-optical pickup apparatus, the coil pattern 7 or 7' is formed on the optical glass 8 or 8' as a plate having light transmission characteristics. Alternatively, in order to prevent reflection, a plate in which a hole for allowing a laser beam to pass therethrough is formed to provide light transmission characteristics may be used.

In the three embodiments, the magnetic field generator 9 is constituted by forming, as the spiral coil pattern 7, the conductor 7a through which current of a high-frequency signal is flowed to generate a magnetic field on the surface 8a of the optical glass 8 having light transmission characteristics. However, a plate on which the coil pattern 7 is formed need not always be an optical glass but may comprise a non-light transmission material, e.g., a metal plate, as will be described in the fourth embodiment. The fourth embodiment will be described below with reference to FIG. 7. The same reference numerals in this embodiment denote the same parts as in the three above embodiments embodiments, and a detailed description thereof will be omitted.

A magnetic field generator 9 of the fourth embodiment is constituted by forming, as a spiral coil pattern 7, a conductor 7a for generating a magnetic field upon reception of a high-frequency signal on a surface 40a of a planar member 40 which is obtained by forming a soft magnetic material such as ferrite into a planar shape. In addition, an opening 40c having a diameter large enough to allow the rays of the laser beam focused by an objective lens 2 to pass therethrough is formed at the central portion of the planar member 40. An end portion 4a of a coil bobbin 4 is adhered and fixed to the opposite surface 40b (which has no coil pattern 7) of the planar member 40 so that the center of the coil pattern 7 is aligned to coincide with the center of the objective lens 2 and to coincide with the center of the opening 40c of the planar member 40. Since the opening 40c is formed at the central portion of the planar member 40, a laser beam emitted from a laser device 1 can be focused on the center of a magnetic field generated by the coil pattern 7.

The planar member 40 may be entirely formed of a soft magnetic material such as ferrite. Alternatively, a base plate formed of a non-magnetic material may be prepared, and a thin film of a soft magnetic material such as ferrite may be formed on the base plate by sputtering or deposition. According to the fourth embodiment, since the coil pattern 7 of the magnetic field generator 9 is formed on the planar member 40 formed of a soft magnetic material such as ferrite, a closed magnetic path is formed between the recording medium and the magnetic field generator 9 as in the case wherein the high-permeability member is arranged as in the third embodiment. Therefore, since magnetic fluxes generated at the side of the objective lens 2 of the pickup can be efficiently guided toward the recording medium, the efficiency of the magnetic field generator 90 can be improved.

The fourth embodiment discloses an arrangement wherein the pickup apparatus is arranged on one surface side of the double-sided magneto-optical recording medium as in the first embodiment. Alternatively, the pickup apparatuses may be disposed on two surface sides of the double-sided magneto-optical, recording medium as in the second and third embodiments to allow simultaneous recording or reproduction on two surfaces, as a matter of course.

In the various embodiments the magnetic field generator 9 or 9' employs a magnetic field modulation method. However, the present invention is not limited to this, and another method, e.g., a light modulation method, may be used without departing from the principles herein.

According to a magneto-optical pickup apparatus of the present invention, since a plate on which a coil pattern for generating a magnetic field is formed and which has light transmission characteristics is arranged near the laser beam focusing means, a distance between the coil pattern and the magneto-optical recording medium can be shortened. A simple arrangement wherein an optical system and a magnetic system are arranged on the same surface side of the magneto-optical recording medium can be realized. In addition, since a sufficient mounting space can be assured above each surface of the magneto-optical recording medium, the degree of freedom in design for the apparatus can be increased.

According to a magneto-optical recording/reproducing apparatus of the present invention, magneto-optical pickup apparatuses each comprising an optical system and a magnetic system can be arranged on two surface sides of a double-sided magneto-optical recording medium, so that recording and reproduction of an information signal on two surfaces of the double-sided magneto-optical recording medium can be performed at the same time or from one surface to the other surface. Thus, a large number of information signals can be recorded/reproduced, and recording/reproduction can be performed at higher speed.

What is claimed is:

1. A magneto-optical pickup apparatus for recording or reproducing data on a magneto-optical recording medium, for use with a laser beam emission means, comprising:

laser beam focusing means for focusing a laser beam emitted from the laser beam emission means onto the magneto-optical recording medium; and magnetic field generating means, arranged adjacent to the laser beam focusing means, for generating a magnetic field to be applied to the magneto-optical recording medium, including a plate made of a material having light transmission characteristics through which the laser beam can pass, and a flat coil pattern, formed on one surface of the plate, for generating the magnetic field.

2. A magneto-optical pickup apparatus according to claim 1, wherein the laser beam is focused by the laser beam focusing means substantially on the center of the magnetic field generated by the coil pattern.

3. A magneto-optical pickup apparatus according to claim 2, wherein the coil pattern is formed on the surface of the plate which is closest to said magneto-optical recording medium.

4. A magnetic-optical pickup apparatus according to claim 1, wherein the plate is arranged between the laser beam focusing means and the magneto-optical recording medium.

5. A magneto-optical pickup apparatus according to claim 1, wherein the laser beam is focused by the laser beam focusing means substantially on the center of the magnetic field generated by the coil pattern.

6. A magneto-optical pickup apparatus according to claim 1, wherein the plate is arranged between the laser beam focusing means and the magneto-optical recording medium.

7. A magneto-optical recording/reproducing apparatus according to claim 1, wherein the magneto-optical recording medium has recording surfaces on two opposing surfaces and two of said magneto-optical pickup apparatuses are arranged on opposite sides of the magneto-optical recording medium.

8. A magneto-optical recording/reproducing apparatus according to claim 7, wherein the two magneto-optical pickup apparatuses arranged on opposite sides of the magneto-optical recording medium are simultaneously operated to simultaneously perform recording/reproduction on the two recording surfaces of the magneto-optical recording medium.

9. A magneto-optical pickup apparatus for recording or reproducing data on a magneto-optical recording medium, for use with a laser beam emission means, comprising:

laser beam focusing means for focusing a laser beam emitted form the laser beam emission means onto the magneto-optical recording medium; and magnetic field generating means, arranged adjacent to the laser beam focusing means, for generating a magnetic field to be applied to the magneto-optical recording medium, including a plate of a light-transmitting material through which the laser beam can pass, and a coil pattern, formed on the plate, for generating the magnetic field.

10. A magneto-optical pickup apparatus according to claim 9, wherein the light-transmitting material of the plate is optical glass.

11. A magneto-optical pickup apparatus according to claim 9, wherein the laser beam is focused by the laser beam focusing means substantially on the center of the magnetic field generated by the coil pattern.

12. A magneto-optical pickup apparatus according to claim 10, wherein the coil pattern is formed on the surface of the plate which is closest to said magneto-optical recording medium.

13. A magneto-optical pickup apparatus according to claim 1, wherein the coil pattern is a printed coil.

14. A magneto-optical pickup apparatus according to claim 1, wherein the coil pattern is a thin film coil.

* * * * *